United States Patent [19]

Friedrich

[11] Patent Number: 4,466,923
[45] Date of Patent: Aug. 21, 1984

[54] SUPERCRITICAL $CO_2$ EXTRACTION OF LIPIDS FROM LIPID-CONTAINING MATERIALS

[75] Inventor: John P. Friedrich, Green Valley, Ill.

[73] Assignee: The United States of America as represented by the Secretary of Agriculture, Washington, D.C.

[21] Appl. No.: 364,290

[22] Filed: Apr. 1, 1982

[51] Int. Cl.$^3$ ............................................ C11B 11/00
[52] U.S. Cl. ............................ 260/412.4; 260/410.7; 260/412.8; 260/428.5
[58] Field of Search ............... 260/410.7, 412.4, 412.8, 260/428.5

[56] References Cited

U.S. PATENT DOCUMENTS

| | | | |
|---|---|---|---|
| 3,843,824 | 10/1974 | Roselius et al. | 426/386 |
| 3,939,281 | 2/1976 | Schwengers | 426/11 |
| 4,168,324 | 9/1979 | Roselius et al. | 426/312 |
| 4,280,961 | 7/1981 | Schneider et al. | 260/412.8 |
| 4,331,695 | 5/1982 | Zosel | 260/412.8 X |
| 4,367,178 | 1/1983 | Heigel et al. | 260/412.4 X |

FOREIGN PATENT DOCUMENTS

| | | |
|---|---|---|
| 2709033 | 9/1978 | Fed. Rep. of Germany . |
| 1356749 | 6/1974 | United Kingdom . |
| 1356750 | 6/1974 | United Kingdom . |
| 2091292 | 7/1982 | United Kingdom ............. 260/412.4 |

OTHER PUBLICATIONS

Stahl et al., "Extraktion von Lupinenöl mit überkritischem Kohlendioxid," Fette, Seifen, Anstrichmittel 83(12): 472–474, (1981).
Stahl et al., "Extraction of Seed Oils with Liquid and Supercritical Carbon Dioxide," J. Agr. Food Chem. 28(6): 1153–1157, (1980).
Caragay et al., "Supercritical Fluid Extraction for Purification and Fractionation of Fats and Oils," presented at 72nd Annual Meeting of American Oil Chemists Society, New Orleans, LA, May 18, 1981, pp. 11, 18–24, & 27–32.
Brunner et al., "The State of the Art of Extraction with Compressed Gases," Lecture presented at Annual Meeting of Process Engineers, Strassburg, Oct. 1–3, 1980, pp. 1, 8–12, 14, 34, & 35.
Johnston et al., "An Analytical Carnahan–Starling–van der Walls Model for Solubility of Hydrocarbon Solids in Supercritical Fluids," AIChE Journal 27(5): 773–779, (Sep. 1981).
Hubert et al., "Extraction with Supercritical Gases," G. M. Schneider/E. Stahl/G. Wilke, eds., Verlag Chemie, Deerfield Beach, FL, 1980, pp. 27–28.
Stahl et al., "A Quick Method for the Microanalytical Evaluation of the Dissolving Power of Supercritical Gases," Angew, Chem. Int. Ed. Engl. 17: 731–738, (1978).

Primary Examiner—Thomas A. Waltz
Attorney, Agent, or Firm—M. Howard Silverstein; David G. McConnell; Curtis P. Ribando

[57] ABSTRACT

In the extraction of lipid-containing substances with supercritical $CO_2$, triglyceride solubilities of up to 20% or more are obtainable by the simultaneous application of temperatures in excess of about 60° C. and pressures of at least 550 bar.

7 Claims, 2 Drawing Figures

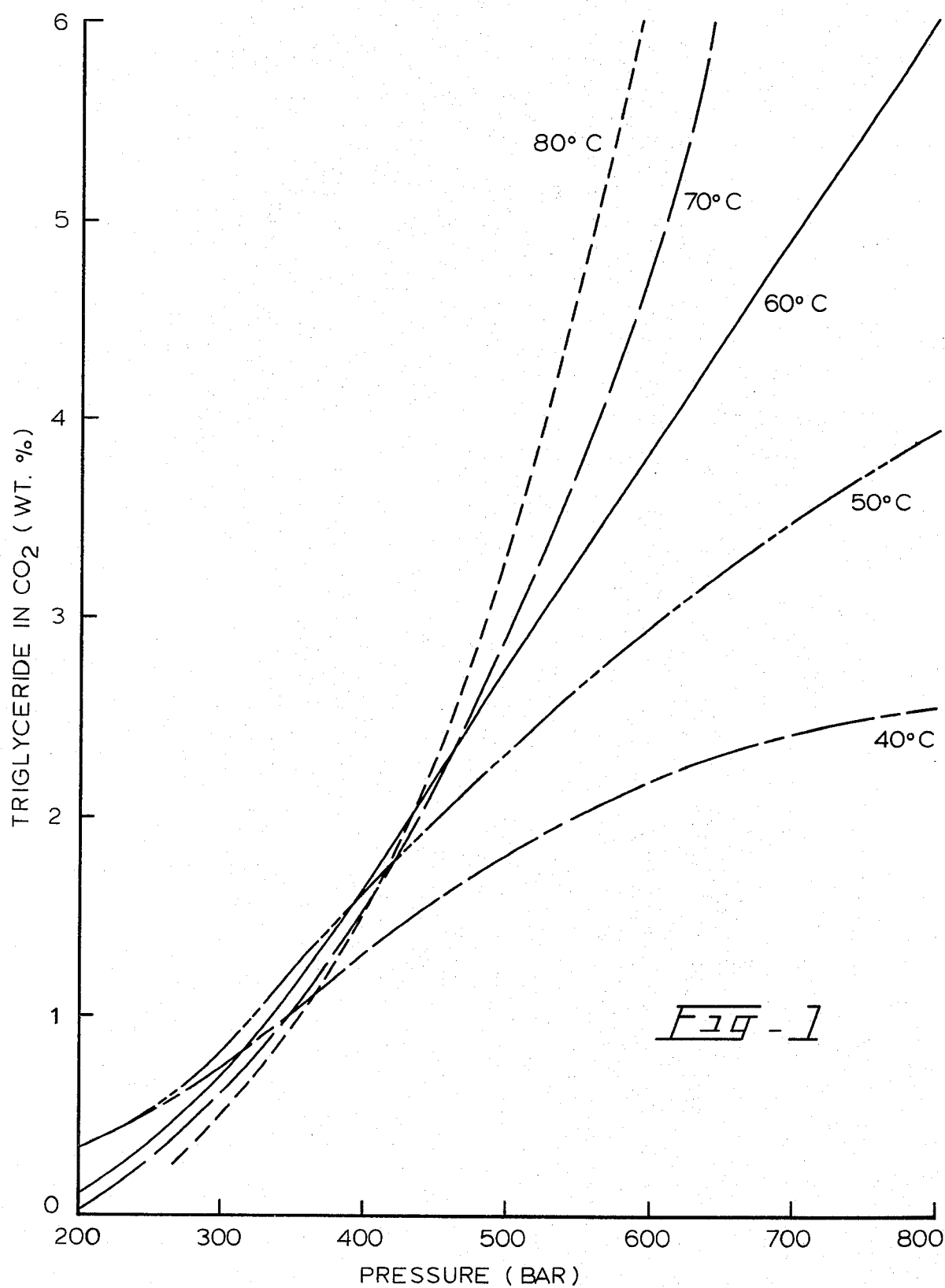

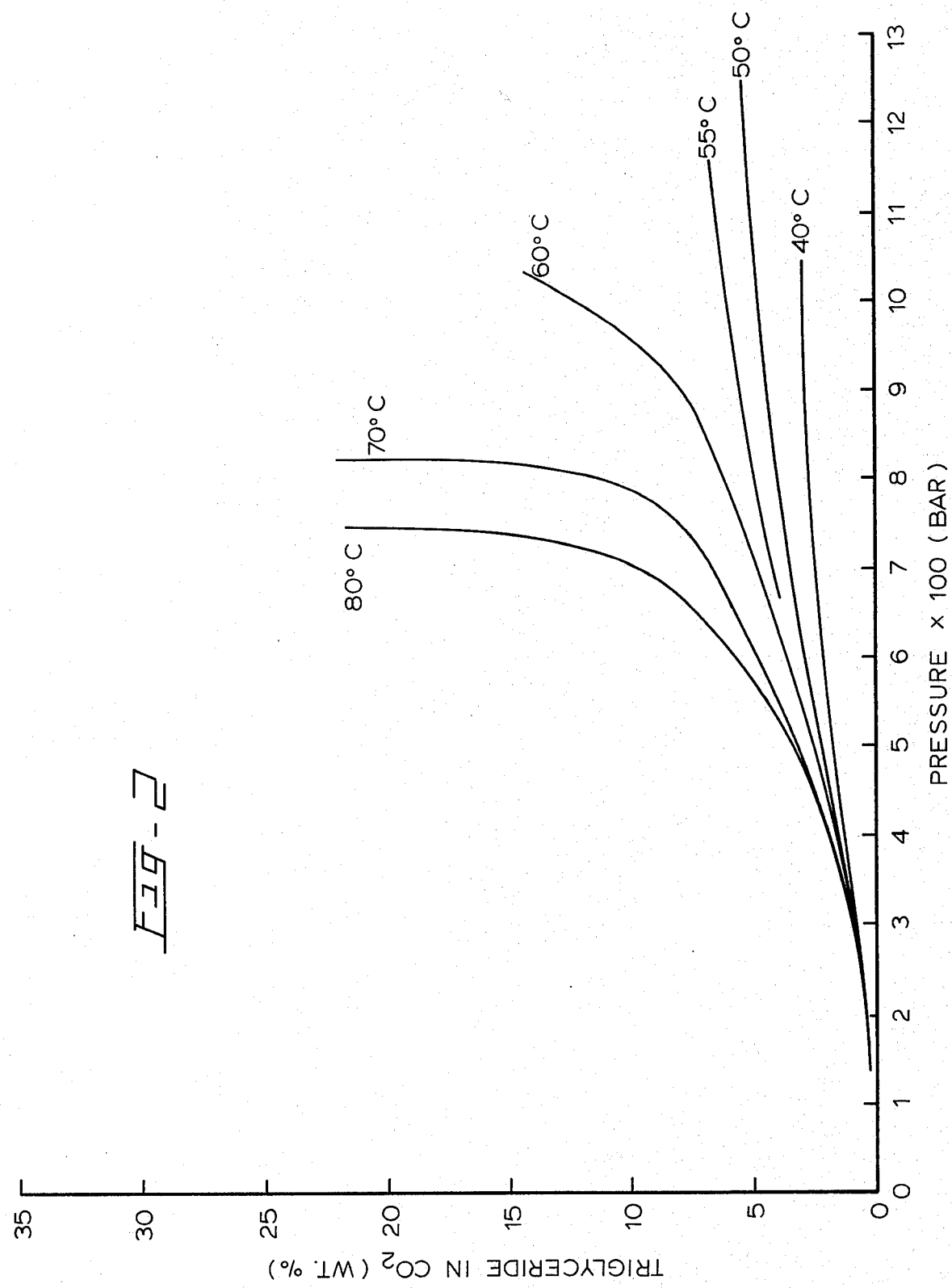

SUPERCRITICAL CO2 EXTRACTION OF LIPIDS FROM LIPID-CONTAINING MATERIALS

BACKGROUND OF THE INVENTION

1. Field of the Invention

Essentially all of the oil from the more than 30 million tons of soybeans as well as millions of tons of other oilseeds and grain commodities crushed annually for use in the United States is extracted with hexane. Problems associated with the use of this solvent are numerous. It is highly flammable and explosive when mixed with air. It is also not selective for triglycerides resulting in the concurrent extraction of undesirable impurities including free fatty acids, phospholipids, pigments, and unsaponifiables. Significant refining losses and attendant energy requirements to remove such impurities contribute to production costs. Moreover, with the rapidly escalating costs, uncertain availability, and potential health and safety-related problems of hydrocarbon solvents in general, the social and economic environment has stirred interest in alternatives.

Supercritical fluids technology may be a viable alternative to current extraction methods. Supercritical fluids (SCF's) are often referred to as dense gases. Technically, an SCF is a gas existing above its critical temperature and critical pressure, as defined in the phase diagram of the pure substance. When a gas is compressed above its critical temperature, densities increase dramatically. Therefore, under a given set of conditions, an SCF may possess the density of a liquid while maintaining the diffusivity of a gas. The solvent properties of SCF's have been recognized for over 100 years but commercial applications have been slow in developing. As far as is known, decaffeination of coffee with supercritical carbon dioxide (SC-$CO_2$) is the only current large-scale commercial SCF process.

SC-$CO_2$ is an ideal solvent because it is nontoxic, nonexplosive, cheap, readily available, and easily removed from the extracted products. Moreover, preliminary unpublished results of Friedrich et al. indicate that the levels of pigments, iron, and phosphorus extracted from soybeans by SC-$CO_2$ are significantly less than those extracted by hexane.

2. Description of the Prior Art

SC-$CO_2$ has been investigated as an extracting solvent in the processing of a vast array of oleaginous products. One of the first teachings of this sort is found in British Pat. No. 1,356,749 wherein a variety of vegetable oils were separated with SC-$CO_2$ from their respective seeds. Similar applications include the extraction of fats and oils from cocoa solids (British Pat. No. 1,356,750), starch-containing vegetable materials (Schwengers, U.S. Pat. No. 3,939,281), chamomile (Stahl et al., German Pat. No. 2,709,033), animal products (U.S. Pat. No. 4,280,961), and lupine seeds [Stahl et al., Fette, Seifen, Anstrichmittel 83(12): 472-474 (1981)]. Additionally, Caragay et al. [presentation at the 72nd Annual Meeting of American Oil Chemists Society, New Orleans, LA (May 18, 1981)] urges that SC-$CO_2$ can be used to effectively fractionate and purify heat-abused oxidized cooking oils.

In a review paper by Brunner et al. entitled "The State of the Art of Extraction with Compressed Gases" (lecture presented at Annual Meeting of Process Engineers, Strassburg, Oct. 1-3, 1980), typical temperature and pressure parameters for extraction of seeds oils with supercritical $CO_2$ were 130° C. at 150 bar, 40° C. at 220 bar, and 50° C. at 350 bar. The paper also states that the solubility of a substance in a supercritical gas depends primarily on the density of the gas. Likewise, Johnston et al. [AIChE Journal 27(5): 773-779 (September 1981)] concludes that solubility correlates best with density as an independent variable and is in fact linear on a plot of log solubility vs. solvent density. According to Hubert et al. ("Extraction with Supercritical Gases," G. M. Schneider, E. Stahl, & G. Wilke, eds., Verlag Chemie, Deerfield Beach, FL, 1980, pp. 27-28) extraction with supercritical $CO_2$ offers the advantages of being able to vary the density and dielectric constants by varying the pressure. This reference shows graphically that the greatest change in density and dielectric constant at 50° C. take place from 70 to 150 bar and that both parameters increase only slightly above about 300 bar. It is clear therefrom that the increased solubility to be expected by employing $CO_2$ at pressures much in excess of 300 bar would not justify the additional energy required. Furthermore, Stahl et al. (Fette . . . , supra), teaches in Table I that increasing temperature at constant pressure reduces the solubility of triglyceride in $CO_2$. In accord with that observation, the preponderance of the art concurs that for oils and other low volatility substances the solubility in SC-$CO_2$ is maximized at temperatures slightly above the critical point. The 3% by weight solubility of sunflower seed oil reported by Stahl et al. [J. Agr. Food Chem. 28(6): 1153-1157 (1980)] at 40° C. and 700 bar is typical of the results obtained by prior art processes. In light of these observations, prior disclosures of extreme conditions (up to 2000 excess atmospheres and 170° C., U.S. Pat. No. 3,843,824) have been no more than academic curiosities. With a plurality of polar compounds, Stahl et al. [Agnew. Chem. Int. Ed. Engl. 17: 731-738 (1978)] shows in FIG. 11 a decelerating rate of solubility increase as a function of pressure up to about 2500 bar at 40° C.

SUMMARY OF THE INVENTION

I have now surprisingly discovered that when SC-$CO_2$ is used to extract a lipid from a lipid-containing substance at a temperature in excess of about 60° C. in combination with a pressure in excess of 550 bar, the solubility of the lipid in the $CO_2$ solvent is dramatically increased over levels heretofore observed. Moreover, I have unexpectedly discovered that the solubility increases at an accelerated rate as the pressure increases along any given isotherm above about 60° C. These responses are in direct contrast to all the previously discussed teachings in the art, in which solubility has been shown to be an inverse function of temperature, and in which accelerated rates thereof have been attributed only to lower pressures in the range of about 70-400 bar.

In accordance with this discovery, it is an object of the invention to provide an efficient and economical method for both the extraction and fractionation of lipids by means of a SC-$CO_2$ solvent.

It is also an object of the invention to significantly reduce the time, energy, and $CO_2$-consumption requirements for lipid extraction under supercritical conditions.

It is a further object of the invention to enhance the solubility of fats and oils in carbon dioxide by a factor of up to four or more over that previously taught in the prior art.

Another object of the invention is to allow the use of pure CO₂ for extraction without the need of entrainers for solubility enhancement.

Other objects and advantages of the invention will become readily apparent from the ensuing description.

BRIEF DESCRIPTION OF THE DRAWINGS

FIG. 1 shows the solubility of triglycerides in SC-$CO_2$ along various isotherms within the pressure range of 200–800 bar.

FIG. 2 shows the solubility of triglycerides in SC-$CO_2$ along various isotherms within the pressure range of about 140–1240 bar.

DETAILED DESCRIPTION OF THE INVENTION

The lipid-containing materials contemplated for defatting by the method of the invention include any material which exists in or which can be converted to a physical state that is permeable to the carbon dioxide under supercritical conditions, and in which the lipid therein is a fat or oil predominantly composed of a triglyceride. Exemplary materials of plant and animal origin without limitation thereto include: oilseeds, such as soy, cottonseed, sunflower, safflower, peanut, and linseed; cereal components, such as corn germ; as well as animal byproducts, suet, offals, and the like. These materials are converted to an extractable form by crushing, grinding, comminuting, flaking, or other known method of making the oil physically available.

Any conventional supercritical fluid extraction equipment comprising an extractor and separator would be suitable for carrying out the method of the invention. After packing the lipidcontaining material into the extractor, the SC-$CO_2$ is injected at the predetermined combination of temperature and pressure. Referring to FIG. 1, it is apparent that solubilities of triglycerides at extraction temperatures of 55° C. or less follow the predicted density-related solubilities taught by the prior art. Likewise, the solubilities below about 400 bar relate inversely to temperature as previously observed. For instance, at 200 bar the solubility at 60° C. is only about 30% of that at 50° C., and at 70° C. it is on the order of 15% of the 50° level. The advantages of the invention become appreciable when temperatures of at least about 60° C. and pressures exceeding 550 bar are simultaneously applied. At 550 bar the solubility is 23% greater at 60' C. than at 50° C. and at higher temperatures and higher pressures, the differences are even more pronounced. This effect is more clearly illustrated in FIG. 2. At 70° C. and approximately 825 bar, the triglyceride solubility in carbon dioxide is in excess of 20% by weight, as compared to about 2.8% at 40° C. and about 5% at 55° C. at the same pressure. It is further apparent from FIG. 2 that between 55° and 60° C., the solubility properties of SC-$CO_2$ undergo a dramatic transition. This phenomenon results in a decelerating rate of solubility increase as a function of pressure below the transition temperature, and an accelerating rate above the temperature. While not desiring to be bound to any particular theory, the crossover effect between about 300 and 450 bar observed for isothermic solubility curves on either side of the transition temperature could be explained in the following manner. Between its critical pressure of 74 bar and 400 bar, $CO_2$ is quite compressible. The density, which is related to solute holding power, changes rapidly in this range; whereas above 400 bar, the rate of change is less. Therefore, any increase in solubility with increase in temperature would be observed at the higher pressures; but at the lower pressures, the increased solubility effect due to temperature may be overcome by the decrease in density and related decrease in solute capacity.

The operating parameters of the invention lie above the transition temperature and above 550 bar pressure. In the preferred mode, extractions are conducted in the temperature range of 60°–100° C., and more particularly in the range 60°–80° C., and in the pressure range of 700–1200 bar. In actual practice, extraction efficiency is maximized at the highest temperature consistent with product integrity and at the highest practical pressure. Having selected one of the conditions, the other can be matched accordingly to give the optimum balance between solubility and energy input. The unexpected acceleration of isothermic solubility curves as a function of pressure above the transition point, and the sensitivity of solute capacity to small changes in pressure, allows highly efficient recovery of dissolved oil in the separator by cycling pressure over a narrow range.

At the endurance limit of the equipment employed in the examples below, solubilities approximating 21% were obtained with the normal solvent flow direction through the substrate from top to bottom. Substantially higher levels, however, would be predicted as attainable from the trend of the curves in FIG. 2. By reversing the solvent direction to flow from bottom to top and applying relatively stringent conditions on the order of at least 70° C. and 800–850 bar, levels of extracted oil surpassing those indicated by the plots have been demonstrated. While it is theorized that some of the oil obtained by this latter method may not actually be dissolved, the relative weight of oil to $CO_2$ yields apparent solubilities upward of 40%.

The following examples are intended only to further illustrate the invention and are not intended to limit the scope of the invention which is defined by the claims.

EXAMPLES 1–48

A 4-1. vertically mounted and thermostated extraction cylinder having an 8.9-cm. inside diameter and safe operating pressure of 2000 bar at 25° C. was charged with flaked triglyceride-containing substrate. The extractor was sealed and pressurized with $CO_2$ injected from either the top or the bottom depending on the desired direction of flow. Dissolved oil was recovered in a separator by reducing the pressure to atmospheric. The percent triglyceride solubility was calculated as the ratio of the weight of collected oil to weight of $CO_2$ solvent passed through the extractor times 100. The conditions and results of each run are reported in Tables I and II below.

It is understood that the foregoing detailed description is given merely by way of illustration and that modification and variations may be made therein without departing from the spirit and scope of the invention.

TABLE I

| Example | Flaked substrate | Direction of solvent flow | Temperature (°C.) | Pressure (bar) | $CO_2$ passed through substrate (g.) | Oil collected (g.) | Solubility (%) |
|---|---|---|---|---|---|---|---|
| 1 | soybean | down | 40 | 207 | 431 | 1.9 | 0.44 |
| 2 | soybean | down | 40 | 344 | 2758 | 25.63 | 0.93 |
| 3 | soybean | down | 40 | 482 | 919 | 15.36 | 1.67 |
| 4 | soybean | down | 40 | 551 | 1107 | 21.59 | 1.95 |
| 5 | soybean | down | 40 | 620 | 910 | 20.08 | 2.21 |
| 6 | cottonseed | down | 40 | 758 | 454 | 11.71 | 2.58 |
| 7 | cottonseed | down | 40 | 1033 | 1362 | 40.11 | 2.94 |
| 8 | soybean | down | 50 | 207 | 2724 | 9.06 | 0.33 |
| 9 | soybean | down | 50 | 344 | 1816 | 21.91 | 1.21 |
| 10 | soybean | down | 50 | 482 | 1362 | 32.03 | 2.35 |
| 11 | soybean | down | 50 | 551 | 454 | 12.25 | 2.70 |
| 12 | soybean | down | 50 | 620 | 908 | 28.38 | 3.13 |
| 13 | soybean | down | 50 | 689 | 1561 | 54.17 | 3.47 |
| 14 | cottonseed | down | 50 | 758 | 959 | 36.69 | 3.83 |
| 15 | cottonseed | up | 50 | 895 | 454 | 21.87 | 4.82 |
| 16 | cottonseed | up | 50 | 964 | 908 | 41.86 | 4.61 |
| 17 | cottonseed | up | 50 | 1033 | 681 | 32.2 | 4.73 |
| 18 | cottonseed | down | 55 | 665 | 908 | 35.69 | 3.93 |
| 19 | cottonseed | down | 55 | 827 | 454 | 23.27 | 5.13 |
| 20 | cottonseed | down | 55 | 964 | 454 | 26.42 | 5.82 |
| 21 | soybean | down | 60 | 207 | 6041 | 6.78 | 0.11 |
| 22 | soybean | down | 60 | 344 | 1839 | 20.6 | 1.12 |
| 23 | soybean | down | 60 | 482 | 919 | 23.37 | 2.54 |
| 24 | soybean | down | 60 | 551 | 919 | 30.45 | 3.31 |
| 25 | soybean | down | 60 | 620 | 919 | 36.08 | 3.93 |
| 26 | soybean | down | 60 | 689 | 460 | 22.56 | 4.90 |
| 27 | cottonseed | up | 60 | 758 | 681 | 36.71 | 5.39 |
| 28 | cottonseed | up | 60 | 827 | 681 | 45.62 | 6.70 |
| 29 | cottonseed | up | 60 | 895 | 454 | 34.46 | 7.59 |
| 30 | cottonseed | up | 60 | 964 | 681 | 68.48 | 10.06 |
| 31 | cottonseed | up | 60 | 1033 | 454 | 64.3 | 14.16 |
| 32 | soybean | down | 70 | 207 | 2298 | 1.25 | 0.05 |
| 33 | soybean | down | 70 | 344 | 919 | 8.7 | 0.95 |
| 34 | soybean | down | 70 | 482 | 919 | 25.43 | 2.77 |
| 35 | soybean | down | 70 | 551 | 919 | 35.74 | 3.89 |
| 36 | soybean | down | 70 | 620 | 1379 | 73.34 | 5.32 |
| 37 | soybean | down | 70 | 689 | 409 | 26.62 | 6.51 |
| 38 | cottonseed | down | 70 | 758 | 454 | 36.68 | 8.08 |
| 39 | cottonseed | up | 70 | 802 | 233 | 72.12 | 30.95[a] |
| 40 | cottonseed | down | 70 | 812 | 227 | 31.23 | 13.76 |
| 41 | cottonseed | down | 70 | 827 | 227 | 46.98 | 20.70 |
| 42 | cottonseed | up | 70 | 854 | 113 | 48.92 | 43.29[a] |
| 43 | dry milled corn germ | down | 80 | 268 | 1067 | 2.74 | 0.26 |
| 44 | cottonseed | down | 80 | 482 | 454 | 13.84 | 3.05 |
| 45 | cottonseed | down | 80 | 568 | 908 | 46.95 | 5.17 |
| 46 | cottonseed | down | 80 | 620 | 908 | 59.99 | 6.61 |
| 47 | cottonseed | down | 80 | 689 | 1362 | 119.18 | 8.75 |
| 48 | cottonseed | down | 80 | 744 | 908 | 130.96 | 14.42 |

[a]These values represent the weight relationship between extracted oil and $CO_2$ solvent, but not necessarily the actual solubility.

TABLE II

| | Solubility (wt. %)[a] | | | | | |
|---|---|---|---|---|---|---|
| Pressure (bar) | 40° C. (Ex. 1-7) | 50° C. (Ex. 8-17) | 55° C. (Ex. 18-20) | 60° C. (Ex. 21-31) | 70° C. (Ex. 32-42) | 80° C. (Ex. 43-48) |
| 207 | 0.44 | 0.33 | — | 0.11 | 0.05 | — |
| 268 | — | — | — | — | — | 0.26 |
| 344 | 0.93 | 1.21 | — | 1.12 | 0.95 | — |
| 482 | 1.67 | 2.35 | — | 2.54 | 2.77 | 3.05 |

TABLE II-continued

| Pressure (bar) | Solubility (wt. %)[a] | | | | | |
|---|---|---|---|---|---|---|
| | 40° C. (Ex. 1-7) | 50° C. (Ex. 8-17) | 55° C. (Ex. 18-20) | 60° C. (Ex. 21-31) | 70° C. (Ex. 32-42) | 80° C. (Ex. 43-48) |
| 551 | 1.95 | 2.70 | — | 3.31 | 3.89 | — |
| 568 | — | — | — | — | — | 5.17 |
| 620 | 2.21 | 3.13 | — | 3.93 | 5.32 | 6.61 |
| 665 | — | — | 3.93 | — | — | — |
| 689 | — | 3.47 | — | 4.90 | 6.51 | 8.75 |
| 744 | — | — | — | — | — | 14.42 |
| 758 | 2.58 | 3.83 | — | 5.39[b] | 8.08 | — |
| 802 | — | — | — | — | 30.95[b,c] | — |
| 812 | — | — | — | — | 13.76 | — |
| 827 | — | — | 5.13 | 6.70[b] | 20.70 | — |
| 854 | — | — | — | — | 43.29[b,c] | — |
| 895 | — | 4.82[b] | — | 7.59[b] | — | — |
| 964 | — | 4.61[b] | 5.82 | 10.06[b] | — | — |
| 1033 | 2.94 | 4.73[b] | — | 14.16[b] | — | — |

[a]The solubilities within the enclosure represent extraction conditions corresponding to the scope of the invention.
[b]Flow of $CO_2$ solvent was upward through the extractor.
[c]These values represent the weight relationship between extracted oil and $CO_2$ solvent, but not necessarily the actual solubility.

I claim:

1. A method for the extraction of a lipid from a lipid-containing material by means of a carbon dioxide solvent under supercritical conditions, said method comprising:
   a. contacting said lipid-containing material with carbon dioxide at a pressure within the range of at least 550 bar and a temperature within the range of about 60° to 100° C. in order to dissolve the lipid in the carbon dioxide, whereby the combination of pressure and temperature is sufficient for the solubility of said lipid in said carbon dioxide to be at least about 5% by weight; and
   b. separating said carbon dioxide with the dissolved lipid from said material.

2. A method as described in claim 1 wherein said lipid is a vegetable oil and said lipid-containing material is a vegetable seed or vegetable seed component.

3. A method as described in claim 2 wherein said lipid-containing material is an oilseed.

4. A method as described in claim 2 wherein said lipid-containing material is a cereal seed germ.

5. A method as described in claim 1 wherein said lipid is an animal fat and said lipid-containing material is of animal origin.

6. A method as described in claim 1 wherein said pressure is in the range of 700–1200 bar.

7. A method as described in claim 1 wherein said temperature is in the range of 60°–80° C.

* * * * *